United States Patent Office 3,445,323
Patented May 20, 1969

3,445,323
MANUFACTURE OF PLASTERBOARD FROM SYNTHETIC GYPSUM
Adolph Schnabel, 12 Lincoln Lane, Broomall, Pa. 19008
No Drawing. Continuation-in-part of applications Ser. No. 251,493, Jan. 15, 1963, and Ser. No. 496,134, Oct. 14, 1965. This application Jan. 19, 1966, Ser. No. 521,500
Int. Cl. B32b *13/08, 5/16*
U.S. Cl. 161—162                  12 Claims

ABSTRACT OF THE DISCLOSURE

This invention contemplates the manufacture of plasterboard from synthetic gypsum, such as the byproduct gypsum of the phosphate recovery process, and involves the neutralization of acidic impurities present in the gypsum by intimately admixing therewith nondolomitic calcium carbonate predominantly of a particle size smaller than 44 microns and in an amount sufficient to impart to the gypsum after calcination at temperatures below 374° F. and when slurried with water a pH of about 6.0 to 7.0.

---

This application is a continuation-in-part of application Ser. No. 251,493, filed Jan. 15, 1963, and of application Ser. No. 496,134, filed Oct. 14, 1965, both now abandoned.

This invention relates to the production of plasterboard from synthetic gypsum. It is primarily concerned with the commercial utilization of the waste material which results from the treatment of phosphorus-bearing ores with sulfuric acid in the conventional phosphate recovery process, but is also applicable to other acid-contaminated calcium sulfate dihydrates. These waste materials, sometimes called byproduct gypsum or synthetic gypsium consist primarily of calcium sulfate dihydrate, $CaSO_4 \cdot 2H_2O$.

Much research has been devoted to the problem of utilizing such waste material, but it has proved to be most baffling, because the synthetic gypsum inevitably contains certain impurities which quite strictly limit its utility.

The invention contemplates a process for the utilization of synthetic gypsum in the production of plasterboard which is of a quality comparable to that normally produced when using natural gypsum.

Plasterboard produced from natural gypsum is a strong, hard-surfaced, rigid sheet of plaster of uniform thickness, encased in and firmly bonded to a heavy paper sheath. The bond will last indefinitely, and the paper will not prematurely discolor or become brittle. A paint film applied to the surface will retain its color and film strength and will not peel or flake off prematurely.

But efforts to produce plasterboard from synthetic gypsum have heretofore failed to yield a product having these properties. The plaster sheet may be lacking in strength or coherence; the paper sheath may fail to form a film and permanent bond with the plaster; the sheath may discolor badly, due to reaction with the plaster core; and paint applied to the surface may flake off prematurely or manifest an unexpectedly rapid deterioration in color or in film strength. It has been generally believed that most, if not all, of these imperfections are attributable to the fact that the synthetic gypsum contains minor quantities of acidic materials, which may be present as free acids, or which may be occluded within the gypsum crystals, or otherwise bound therein, which acids are released when the gypsum is calcined, thus being present as free acids in the calcined product.

Other workers in this field have attempted to solve what at first impression would seem to be a relatively simple problem, by applying various treatments intended to decompose or neutralize this unwanted acidity. The present invention comprehends the discovery that decomposition or neutralization is not itself sufficient, and that with one critical exception, the neutralizing agents themselves create fresh and highly troublesome problems.

Briefly stated, this invention contemplates the manufacture of plasterboard from synthetic gypsum, such as the by-product gypsum of the phosphate recovery process, and involves the neutralization of acidic impurities present in the gypsum, by intimately admixing therewith precipitated chalk (which is the preferred neutralizing agent) or other non-dolomitic calcium carbonate in extremely fine particle size, in quantities sufficient to impart to the gypsum after calcination at temperatures not above 374°, a pH, when slurried with water, of between about 6.0 and 7.0. This may be accomplished with as small an addition as 1%, in some cases, where precipitated chalk is used, but for normal operation, it is preferable to use an amount of calcium carbonate equal to about twice the amount of acid present, calculated as $H_2SO_4$. The calcination is so conducted as to reduce the dihydrate gypsum to a state in which it consists primarily of the hemi-hydrate form. After calcination, the material is further pulverized, preferably in a tube mill. One important result of such milling is that it will promote reaction of the neutralizer with the acidic material and will increase the pH of the stucco, in some cases from as low as 6.5 to approximately 7.0. Another result is to produce a change in the physical nature of the particles, so as to impart to a slurry formed therefrom a much needed increase in plasticity. The finely pulverized gypsum, blended with water and conventional addition agents, such as binders, fillers, fibers, accelerators, retarders or dispersants, is then spread upon the back of a standard facing sheet, shaped and back-covered, allowed to harden, cut to size, and then dried. The product manifests commercially acceptable compressive and tensile strength characteristics, and the back and cover sheets are firmly bonded to the plaster core and will have a resistance to discoloration and deterioration which is comparable to that of plasterboard made from natural gypsum.

In order to appreciate the significance of the present invention, it is necessary to refer briefly to the conventional procedure for making plasterboard, and to discuss some of the problems which confront those who seek to use synthetic gypsum in this operation.

In the board-making operation, the calcined gypsum, commonly referred to in the industry as "stucco," together with any desired additions, such as fiber, binder, foam, retarder or accelerator or dispersants, is mixed with water and stirred. The amount of water added is carefully controlled to yield a settable mixture of a good flowable consistency, known as slurry. This is discharged from the mixing equipment onto a base sheet of heavy paper, in the form of a continuous, moving web, on which the slurry is spread to a uniform thickness. A covering paper web is simultaneously applied, above the slurry. The rolls which guide the paper also serve to shape the slurry and control its depth. An endless conveyor carries the board through stages in which the core hardens by hydration. The continuous web is thereafter cut to panels of appropriate length. Then the panels are moved on another conveyor through drying ovens prior to storage or shipment.

This procedure yields excellent results when natural stucco is used, but, as suggested above, works very poorly or not at all when the stucco is prepared from untreated synthetic gypsum wastes, the assumption being that the presence of acidic impurities is responsible for the trouble.

These impurities inevitably include various acidic compounds of phosphorus, because recovery of phosphate values can never, in the very nature of things, be complete. Although most of the sulfuric acid used in the antecedent process will, in the waste material, be in the form of calcium sulfate dihydrate, some other sulfur compounds may also be present, in addition to sulfuric acid. Acidic compounds of fluorine, such as fluosilicic acid, may also be present, depending on the composition of the phosphatic ore previously treated. Metallic compounds such as those of iron and aluminum, are likely to occur in small amounts, but their presence seems to create no problems.

Even though the amount of the acidic impurities mentioned usually accounts, in the aggregate, for less than 2% of the waste material, it is sufficient to prevent successful utilization of synthetic gypsum in the making of plasterboard of a commercially acceptable quality at an economically permissible cost.

Various approaches to the problem have previously been proposed. One of these has been high temperature calcination to eliminate the acidic constituents. This requires treatment at quite high temperatures, ranging upwards of 2,000° F. This not only involves rather high fuel costs (because of the heat required) but also results in the production of calcium sulfate in an anhydrous form. Such anhydrous calcium sulfatfe does not lend itself to the manufacture of plasterboard for various reasons. One of these is the fact that it rehydrates quite slowly, so that too much time is needed to ensure that most of the particles of calcium sulfate in the slurry have been uniformly and completely hydrated.

Another approach to the problem has been the proposal to treat the raw waste with neutralizing agents having an alkaline reaction at some stage either before or after grinding and calcination. This technique may be very effective in the laboratory, where it is possible to determine with considerable accuracy precisely how much of the neutralizing agent is necessary to react with the exact amount of acidic material present.

But the waste material with which we are here concerned is not a uniform product. The nature and quantity of acidic compounds present in it vary quite widely. Since the available phosphate in the rock varies, the amount of acid used to treat it must be varied accordingly. Consequently, the content of impurities in the waste gypsum likewise continually varies. Furthermore, the acidic impurities are not wholly superficial: rather, large portions are distributed, it is believed, throughout the structure of the crystals, so that complete qualitative and quantitative analysis is difficult and time-consuming.

It is not practical, in a quantity-production process, to make continuous determinations of the nature and character of the acidic materials present in successive quantities of waste. Consequently, the amount of neutralizing agent needed to counteract these impurities precisely is not ascertainable on a practical basis. Yet, unless all the reactive acidic material is neutralized, the result is only a change in degree, and not in kind. The product is still unsatisfactory because even a minor amount of reactive acidic material will impair the properties of the finished board. Conversely, if the amount of conventional neutralizing agent used is more than enough to react precisely with the acidic materials, a good bond with the paper sheath is unlikely to be formed. Nor can a good bond be achieved if the neutralizing agent is or reacts to produce considerable quantities of soluble salts.

One proposal has been to use ammonia or ammonium salts. Ammonium salts are generally soluble, and ammonia will react with acidic materials to form ammonium salts, such as ammonium sulfate. This latter is a well known accelerator, commonly used to shorten the setting time of stucco. If it is present, in an amount greater than that suitable for effecting setting of the slurry at the time interval desired, the slurry will set up so quickly that proper operation of the machine will become practically impossible. Therefore, since it is quite difficult, if not impossible, to determine precisely how much ammonium sulfate may be present in the slurry just before rehydration, it becomes acutely difficult or impossible to add retarder, when needed, in quantities which will be precisely sufficient to counteract the effect of the accelerator.

Another approach to the problem has been the proposal to use compounds of the alkali metals. However, compounds of sodium will react to form soluble salts, and it is a well-known fact that one of the major difficulties in attempting to follow neutralization procedures of this sort is that the presence of the soluble sodium salts so produced renders the stucco quite unfit for use, primarily because of the adverse effect on the bond between the paper and the plaster.

One of the reaction products formed when an alkaline potassium salt is used will be potassium sulfate. This is not only a soluble salt, per se, but also, like ammonium sulfate, is a well-known accelerator, used to shorten the setting time of stucco. If potassium sulfate is present in an amount greater than that suitable for effecting setting of the slurry at the time interval desired, the slurry will set up so quickly that proper operation of the machine will be practically impossible. Other alkali metals behave similarly, and can be ignored in any event because of their cost.

Another class of neutralizing agents tested was the magnesium compounds. The hydroxide seemed likely to be particularly promising, but stucco which contained excess magnesium hydroxide as such, or acid salts of reaction with magnesium compounds proved to be quite unpredictable in the matter of forming a good bond with the paper, and plaster formed from it had very low strength.

The use of hydrated lime for neutralizing synthetic gypsum prior to calcination has also been attempted. Although the stucco so produced may be satisfactory for some purposes, repeated attempts to use this stucco in the manufacture of plasterboard have been unsuccessful. In all cases, failure was due to lack of bond between the gypsum core and the paper covers. The failure of the slurry to form a proper bond is attributed to the presence of unreacted lime in the stucco. It is well known in the art that the addition of even small quantities of lime to natural stucco used in making board results in an inferior paper-to-plaster bond.

It is possible in the laboratory to add precisely the right amount of lime to the acidic synthetic gypsum to react stoichiometrically with all of the acids present during calcination, so that no unreacted lime remains in the product. But here again the commercial impracticality of running a continuous and wholly accurate check on the varying acid content of the impure gypsum militates against the use of lime as a neutralizing agent in a quantity-production process.

After many experiments, it has been found that the ideal material, which will react quickly and effectively with the acidic impurities present in synthetic gypsum to form reaction products which do not interfere with the formation of an acceptable plasterboard, is precipitated chalk. This is a synthetic calciumcarbonate, most commonly obtained by precipitation from a calcium salt solution to which a soluble carbonate has been added.

That calcium carbonate, in the form of precipitated chalk, could be used effectively for the present purpose was a most surprising discovery, not only because of the failure to attain success with other neutralizing agents of alkaline reaction, but most especially because calcium carbonate itself, in the form of marble dust and in the form of ground limestone, in earlier experiments, had yielded products which were not acceptable. In the light of improved understanding, plausible reasons for the failure of calcium carbonate in its natural form suggested themselves. More will be said of that hereafter.

The discovery that precipitated chalk could be used in this process was accompanied by another very important discovery, namely, that even if twice as much of this neutralizing agent as is theoretically required is used, this imposes no burden on the process and entails no impairment of the bond strength of the final product. The need for determining with great precision the exact amount of neutralizing agent required to react stoichiometrically with the varying acidic content of successive batches of synthetic gypsum is thus eliminated.

The preferred process, as noted above, employs precipitated chalk. It is carried out in the following manner:

The synthetic gypsum is usually received in a wet lumpy condition. It is highly desirable to initiate neutralization of this material as soon as possible, by creating as intimate an admixture of it with precipitated chalk as can be effected. This is preferably done by feeding the precipitated chalk in measured quantities onto a stream of the synthetic gypsum. A drag chain for the gypsum, synchronized with a proportional feeder for the chalk, is effective. The mixture is fed through a high-velocity swing hammer mill, which breaks up the lumps and effects an intimate blend of gypsum and chalk. This blended material is dried to drive off free moisture, but at relatively low temperatures—say in the neighborhood of 150° F. (Low temperature drying ensures against premature calcination, such as might occur after dehydration at elevated temperatures.) A heated Raymond mill may be used as a drying unit, thus increasing the intimacy of the mixture.

The particle size of precipitated chalk is extremely fine. Normally, more than 99% of it will pass a 325-mesh screen, the openings of which are about 44 microns in size.

The amount of precipitated chalk to be used is, as indicated above, not critical, so long as it is enough to react with all of the free or potentially free acidic compounds present. Thus this invention renders wholly needless the highly accurate qualitative and quantitative determinations of the acids present, which were previously required. It is enough merely to calcine a few random samples, titrate the acid content, and calculate it all as $H_2SO_4$.

For practical purposes, it is desirable to use about twice as much precipitated chalk as is required to react with all of the acid actually and potentially present. On an average basis, this may, for illustrative purposes, be translated into a direction to add three pounds of chalk to a 100-pound batch of synthetic gypsum which contains about 1½ pounds of acidic material, calculated as $H_2SO_4$ equivalent. This is an ample margin to cover variations in calculated acidity of different portions of the same shipment of synthetic gypsum. More may be used without any disadvantage other than an increase in cost and a proportionate reduction of the cementitious content of the mixture. Any sulfuric acid present or generated in situ will react with the calcium carbonate to produce more gypsum, $CaSO_4.2H_2O$, and yield the desired product, $CaSO_4.\frac{1}{2}H_2O$.

It is of course possible to produce an intimate blend in other ways. One such way is to disperse the synthetic gypsum and the precipitated chalk in a large volume of water, using a high-shear mixer. The dispersion may be passed through a scalping screen to remove trash; may then be thickened, as in a Dorr-type thickener, with decantation of supernatant liquor; may be centrifuged, and then heat dried at relatively low temperatures. The centrifuge cake may be disintegrated in a hammer mill, if desired. Alternatively, the synthetic gypsum may first be dried and then blended with the calcium carbonate. But in any event, it is essential that the synthetic gypsum waste and the neutralizing agent be present in the form of an intimate admixture in a finely divided state at the time of calcination.

When such a blend has been produced, the treatment presently preferred is to convey it to a conventional gypsum calcining kettle, which is gradually heated to a temperature at which 75% of the water of crystallization of the gypsum crystal is expelled. On a normal batch of 15 tons, this may take from an hour and a half to two hours and a quarter, at calcining temperatures ranging up to 350° F.

The time required may vary in accordance with several factors, such as the size and shape of the calcining kettle, the effectiveness of the heating arrangements, etc. However, as is well known in this industry, the temperature of calcination tends to stabilize at about 250° F., until most of the material has been reduced to the hemihydrate state. Turbulence will then diminish, and the temperature will begin to rise. When this occurs, the charge is withdrawn, preferably at temperatures in the neighborhood of about 300° F. to 330° F.

When calcination has been carried to the point described, it will be found that the acids or acid salts present in the starting material have substantially reacted with the calcium carbonate to produce insoluble calcium salts of the acids, with release of water and carbon dioxide gas. The heated gypsum has been converted into stucco. A sample of this stucco, slurried with ten times its weight of distilled water, should manifest a pH of at least 6, and preferably above 6.5.

It should be mentioned that apparatus is now available which is capable of performing two or more of the process steps thus far described in a single unit, either by recycling, with adjustment of grind and temperature, or by providing sequential treating stages for continuous flow. Indeed, multistage units can be had which will perform all three of the steps outlined in a continuous flow, adding and blending in the neutralizing agent, grinding and drying the mixture, and then adding sufficient heat in a final stage to effect calcination.

If the material, as taken from the calcining kettle is admixed with other ingredients normally used in wallboard manufacture and water is added to produce a good flowing consistency, it will be found that the slurry so prepared cannot be formed into a commercially acceptable plasterboard. It will be difficult to work, and will not form a satisfactory bond with the cover papers. Furthermore, the board will not be as strong as it should be.

It will be necessary to add about 85 parts of water to 100 parts of the calcined material in order to produce a flowable consistency for making board. When this slurry is placed upon the paper backing sheet, it will lose water very rapidly to the paper, both base and cover sheets, and impair adhesion between them and the plaster core. Furthermore, excess water constitutes a burden on the process, since it must be removed in the final drying operation.

It has been discovered that it is possible to overcome these difficulties by subjecting the powdery product of the calciner to a subsequent grinding operation. This final grinding is preferably performed in a tube mill. Such mills are well known. They are, essentially, no more than cylinders or tubes, which are rotated on a horizontal axis and which contain porcelain balls, metal balls or rods.

Milling is carried out in the tube mill until the resultant powder is so fine that two-thirds or more of it will pass a 200-mesh screen and at least about 45% of it will pass through a 325-mesh screen, having openings about 44 microns in size. An astonishing change takes place in the nature of the material as a result of this tube-milling operation. When it comes from the calcining kettle, the stucco is in the form of a powder which, when mixed with water to a mortar consistency, will spread like wet sand; whereas, when it comes from the tubing operation, it has acquired a homogeneous quality such that when mixed with water to a mortar consistency, it can be spread almost like butter. If a slurry is prepared from the tubed powder so produced, it will be found that a good flowable consistency for making board can be achieved with the addition of as little as 60 parts of water in relation to 100 parts of the powder, whereas, as noted above, 85 parts of water to 100 parts of stucco were necessary for the stucco that was merely calcined.

Another, and equally unexpected, result of the milling step just described is that it aids in the neutralization of any remaining acidic content of the gypsum, not heretofore neutralized in the process. Of course, this is predicated on the assumption that the calcium carbonate was used in sufficient quantity to effect neutralization. Thus a batch of calcined material having a pH of only 6.0 when slurried with ten times its weight of water, can still be used in the manufacture of plasterboard, because the material, after tube milling, will manifest a pH of 6.5 or 6.6 when similarly slurried with water. As a general criterion, it may be taken that if the pH of the stucco in the storage bin of the board-making machine is between 6.5 and 7.0 a satisfactory product will be formed.

The extent of the milling seems to bear a direct relationship to the ease with which a slurry of good flowable consistency may be formed, the amount of water needed to form such a slurry, and the quality of the paper-to-plaster bond which results. This relationship is not strictly functional, however, for the result is also influenced by the nature of the calcined material. Consequently, even though reduction to a particle size of the order indicated is desirable, it is better to rely on plasticity tests of the slurry produced than to rely entirely on screen tests.

A quick method for measuring plasticity follows the old Carson blotter test for indicating the plasticity of lime. A small quantity of stucco, as it comes from the tube mill, is mixed with water to a mortar-like consistency, and a dollop of this paste is placed on a piece of ordinary blotting paper—say, possibly 4″ x 10″. A stiff spatula or knife is used to spread the paste over the surface of the blotter. A firm stroke in one direction is followed immediately by a firm stroke in the other, and this is repeated until the paste feathers or tears, and is too stiff to work. Just enough pressure and speed (about one stroke per second) are used to obtain a good spreading action, both being influenced by the resistance offered by the paste. The number of strokes possible affords a reasonably good indication of the plasticity of one batch as compared to another, and is referred to hereafter as the plasticity number.

In producing plasterboard according to the present invention, it is best to use a stucco which yields a plasticity number of three or more. The plasticity number can be increased by tubing the stucco for a longer time. Since prolonged tubing is costly, in terms of power and processing time, practical considerations indicate a preferred range of plasticity of from 3 to 20, inclusive. A plasticity value significantly higher than 20 may impede the formation of a smooth slurry.

The final steps in the formation of the plasterboard are essentially the same as those followed in the manufacture of plasterboard from natural gypsum. The calcined material, after having been processed in the tube mill, is taken to the conventional mixer, on the board-making machine, where water and the usual additives are blended with it. Such additives include accelerators or retarder, binders, such as starches and gums, fiber, foam, and the like. The formation of the slurry requires very little time—at the most only a few moments.

The slurry is then flowed immediately through the discharge gates, from which it is distributed over the bottom sheet, being spread out and reduced to a uniform thickness under the web of the upper sheet which is applied by means of a standard forming roll.

The ribbon of formed board then travels on a conveyor to allow time for the plaster core to harden by hydration or setting action. The ribbon is then cut into panels of desired length and the panels are fed into a conventional wallboard dryer, where the excess water is removed.

It is important that the plaster in the core of the board be substantially completely hydrated before the panels are subjected to the heat of the dryer because the high temperature would inhibit further hydration.

Stucco produced from synthetic gypsum of the kind described normally hydrates at a considerably slower rate than stucco made from natural gypsum rock. Even when board made from synthetic gypsum has hardened sufficiently to be cut into panels, the hydration is usually far from complete. It may be only 45% to 55% hydrated. For that reason it is necessary to delay introduction of the panels into the heated dryer for as much as 10 to 30 minutes to permit the plaster core to become substantially fully hydrated, thereby developing maximum core strength and bond of the covering paper.

The rate of hydration, in the present process, as in prior practice with natural gypsum, may be affected to some extent by changing the amount or type of accelerator used. If potassium sulfate is too slow, for example, aluminum sulfate or ammonium sulfate may be substituted.

The setting process is an exothermic reaction and this causes the temperature of the board to rise rather rapidly during the hydration period. When the temperature reaches a maximum and no further rise in temperature is manifested the plaster core has reached substantially complete hydration.

The following detailed examples will serve to illustrate other embodiments of the process.

Example I

A batch of synthetic gypsum obtained from Bartow, Florida, was used. This had the following analysis, in a dried, lump-free condition:

|  | Percent |
|---|---|
| $CaSO_4 \cdot 2H_2O$ | 91.7 |
| $H_2O$ (free) | 0.9 |
| Insoluble inerts: sand, clay, shale | 5.3 |
| Acid-soluble inerts | 2.1 |
| $Cl^-$ as NaCl | nil |
| Sodium as $Na^+$ | 0.003 |

The acid content, measured as $H_2SO_4$ equivalent, was 1.45% of the total weight of the material. This value was found by calcining a sample of the material at 350° F., slurrying a portion of the calcine, and titrating the slurry with a standard solution of sodium hydroxide to a phenolphthalein end point. The amount of calcium carbonate theoretically needed to react with 1.45 lbs. of acid is almost exactly 1.42 lbs.

A 100 lb. batch of this material was dried and rendered lump free, and to it 1.5 lbs. of precipitated chalk were added. This represents an operational minimum excess over theoretical needs. For normal production, the quantity of chalk added should be at least 2.13 lbs. The particle size of the chalk was such that it would pass a screen having an opening size of about 44 microns—the normal standard of a 325-mesh screen.

The precipitated chalk and the synthetic gypsum were intimately blended by passing the material through a hammer mill.

The now thoroughly blended powder was fed to a batch calcining kettle where it was heated at calcining temperatures of about 250° F. until the primary water of crystallization had been driven off, as indicated by rising temperature. At 325° F. the calcined material was withdrawn.

A 15 lb. charge of this material was fed to a tube mill 11½″ in diameter, and 12½″ long. The mill contained 50 lbs. of steel balls, and had a rotational speed of 66 r.p.m. The milling operation was continued for 15 minutes. At this point, a screen test showed that 60% of the material would pass a standard 325-mesh screen.

Water was added to a sample of this highly pulverized powder until a good mortar-like consistency was reached. This required 1 part by weight of water in relation to 2 parts by weight of the powder. The resulting paste had a pH of 6.9, which is substantially neutral. When subjected to the blotter test, it had a plasticity value of 3.

Enough of the material to make a test specimen of plasterboard was then mixed with the usual additives and 60% by weight of water, to provide a flowable slurry. The slurry was then cast on a paper base in a hand frame, and covered with paper. Excess slurry was squeezed out under a leveling plate.

The resultant board, after drying, was of commercially acceptable quality. The bond between the paper sheath and plaster core was perfect, whether tested wet, dry or humid.

Example I

Synthetic gypsum waste used in this example was obtained from Tulsa, Okla. It had the following analysis in a dried, lump-free condition:

| | Percent |
|---|---|
| $CaSO_4 \cdot 2H_2O$ | 90.7 |
| $H_2O$ (free) | 0.7 |
| Insoluble inerts: sand, clay, shale | 7.1 |
| Acid-soluble inerts | 1.5 |
| $Cl^-$ as NaCl | Nil |
| Sodium as $Na^+$ | Nil |

The total acid content measured as $H_2SO_4$ equivalent was 1.75% by weight of the material.

To a 100 lb. batch of the dry, ground material, 3 lbs. of precipitated chalk were added. This approaches a maximum addition from the standpoint of economics. Such proportions should be used where the acid content in random batches taken from the same shipment of material varies widely from batch to batch.

The precipitated chalk was blended with the gypsum by passing the material through an Imp mill. The blended powder was calcined as in Example I. When slurried with water, this showed a pH of 6.9. A 15 lb. charge of the calcined material was milled in the same way as in Example I, for 15 minutes. At this point a screen test showed that only 44.9% of the material would pass a standard 325-mesh screen. Nevertheless, 50 parts by weight of water, to 100 parts of stucco by weight, was sufficient to establish good mortar-like consistency. The resulting paste had a pH of 7.0. The sample was tested for plasticity using the blotter test. The plasticity value was 3.

A test specimen of plasterboard was made from this material, as in Example I, and with the same results.

This example, as compared to Example I, shows the desirability of coordinating particle size with plasticity value. The blotter test in both examples was the same, even though the screen test in Example II showed a less thorough comminution than that of Example I. Because of the importance of the milling operation, and its influence on the bond strength of the final product, illustrative tables are appended, dealing with particle size. U.S. Standard screen sizes have been used throughout.

The following table shows the particle size of the synthetic gypsum at various stages of the process, where the starting material had the composition described in Example I.

TABLE 1

| Screen size | Dry, ground waste | Blended | Calcined | Tube milled |
|---|---|---|---|---|
| +30 | 1.4 | 0.1 | 0.1 | 0.1 |
| +50 | 3.8 | 1.0 | 0.7 | 1.0 |
| +100 | 11.5 | 8.0 | 5.4 | 6.0 |
| +200 | 42.8 | 31.7 | 24.9 | 19.1 |
| +325 | 69.4 | 64.7 | 54.9 | 39.5 |
| (−325) | (30.6) | (35.3) | (45.1) | (60.5) |

These values reflect the cumulative percent of the total charge which was retained on each of the screens shown, except that the last value shows the percentage which passed through the finest screen used.

The first column covers the dried and ground starting material; the second, the synthetic gypsum after it has been intimately blended and ground with the neutralizing agent. The third column covers the calcined material as discharged in hemihydrate form; and the fourth column shows these values after milling for 15 minutes, as described in Example I.

The following table shows the distribution of fines when processing another typical shipment of synthetic gypsum, received from a phosphate mill in Tulsa, Okla. The columns have the same significance as in Table 1.

TABLE 2

| Screen size | Dry, ground waste | Blended | Calcined | Tube milled |
|---|---|---|---|---|
| +30 | 0.7 | 0.1 | 0.1 | 0.3 |
| +50 | 1.4 | 0.4 | 0.4 | 0.9 |
| +100 | 12.0 | 5.9 | 6.8 | 6.3 |
| +200 | 55.2 | 36.4 | 41.1 | 32.5 |
| +325 | 80.9 | 62.9 | 65.9 | 55.1 |
| (−325) | (19.1) | (37.1) | (34.1) | (44.9) |

It may be observed, parenthetically, that the amounts of milled calcine retained on the coarser screens may be greater than before tubing, because some of the flour-like milled material tends to form agglomerates.

In the following table the distribution of fines is shown with reference to the material described in Example II after milling in the tube mill for varying time intervals, the first column giving the distribution of fines in the calcined material as fed to the tube mill but before tubing began.

TABLE 3

| | (1) | (2) | (3) | (4) | (5) |
|---|---|---|---|---|---|
| | Calcined, 0 min. | Tube Milled | | | |
| Screen size | | 15 min. | 30 min. | 45 min. | 60 min |
| +30 | 0.1 | 0.3 | 0.6 | 0.7 | 0.8 |
| +50 | 0.4 | 0.9 | 1.9 | 3.0 | 3.6 |
| +100 | 6.8 | 6.3 | 10.5 | 10.5 | 12.1 |
| +200 | 41.1 | 32.5 | 30.5 | 32.3 | 31.1 |
| +325 | 65.9 | 55.1 | 48.9 | 48.8 | 45.5 |
| (−325) | (34.1) | (44.9) | (51.1″) | (51.2) | (54.5) |
| Plasticity, blotter test | 1 | 3 | 20 | 28 | 31 |

At the bottom of each column the results of the blotter test are given. The material which had not ben tube milled, when made into a paste of mortar-like consistency, stiffened so quickly that only one stroke of the spatula could be made. By the time the second stroke was begun the slurry had begun to feather, and was no longer workable.

After tubing for 15 minutes, plasticity of the mortar had been trebled, so that three strokes could be made before stiffening occurred. The most significant difference is shown in column 3, where plasticity has been increased nearly seven-fold, over column 2, simply by doubling the time of tubing. An increase in the tubing time results in a progressive increase in the plasticity of the mortar. But since the mortar will have sufficient plasticity for some purposes when made from stucco milled to a plasticity of 3, it is economically unsound to prolong the tubing of material intended for such purposes. For most industrial uses, milling to obtain a plasticity higher than 20 is seldom needed. In any event, the screen test is a guide, but the plasticity number is the controlling value. The nature of the starting material being treated obviously affects both the particle size attained after milling for a given time interval, and the plasticity number of the resulting mortar.

It will be noted that about 67.5% of the calcined and tube-milled product in Table 2 and Table 3 passed the 200-mesh screen, and that 44.9% passed the 325-mesh screen. For practical purposes, it is recommended that milling in the tube mill be carried on until at least 65% of the product will pass a 200-mesh screen and 40% of it will pass a 325-mesh screen.

The importance of using the neutralizing agent in an extremely fine state of subdivision is illustrated by the following example.

Example III

Synthetic gypsum waste of the same composition as shown in Example II was processed in exactly the same way as stated in that example. However, instead of adding 3 lbs. of precipitated chalk, 3 lbs. of high calcium limestone in a very finely ground state were substituted. The limestone referred to was purchased under the trademark Atomite, and the specifications for it gave the distribution of fines as ranging from .5 to 10 microns, with a mean particle size of 2.5 microns.

A satisfactory product was obtained, even though the analysis of the limestone indicated the presence of a minor amount of magnesium carbonate, in the neighborhood of 1%. (This is far below the proportion of magnesium carbonate present in dolomitic rock.) These results were confirmed by other experiments with high-calcium marble dust and powdered high-calcium limestone in which satisfactory board was obtained, but only when the natural carbonate added contained enough ultra-fine particles (smaller than 44 microns) to neutralize all of the reactive acid content of the gypsum, and did not contain magnesium carbonate in dolomitic proportions.

That a satisfactory product could be formed when using a natural calcium carbonate was most surprising, for previous experiments with such material had been disappointing. On careful reappraisal of this earlier work it appeared that some experiments had failed because the limestone used was dolomitic, i.e., contained a fairly large amount of magnesium carbonate. Where magnesium carbonate is present in substantial amounts, as it is in dolomite, it cannot apparently be used in the present process, because a good plaster/paper bond does not result.

But in two earlier experiments the limestone used had been a non-dolomitic high-calcium rock. This limestone was very finely ground, and was sold under the name of "Purestone." The specifications indicated that 90% of it would pass a 325-mesh screen. Yet when it was added to a synthetic gypsum, even in proportions of 5 lbs. in relation to 100 lbs. of gypsum, the slurry after calcination was still too acid to permit the casting of a board.

After the successful test with "Atomite," these latter experiments were repeated, using Purestone, and a synthetic gypsum having a calculated acidity of about 1.5%. Even with only 3% of Purestone, satisfactory results were secured, and this in spite of the fact that physical evaluation of the Purestone showed that only 75% of it would pass a 325-mesh screen. The success of the later experiment may be attributable in part to the exercise of much greater care to ensure a thorough mixing of the carbonate with the gypsum, prior to calcining, or to a thorough milling of the calcined stucco, which may have been omitted in the earlier tests.

Be that as it may, it appears that when the criteria set up in this specification are carefully followed, natural calcium carbonate may be employed as the neutralizing agent with satisfactory results. One of these is that there must be enough of the calcium carbonate present in a fine state of subdivision to react with the acidic compounds actually or potentially present. Several varieties of high-calcium limestone have been evaluated with a Coulter counter, and the distribution of fines in each appears in Table 4. Each of these has been intimately mixed and blended with a synthetic gypsum having a calculated acidity (as $H_2SO_4$) of 1.12%, in the ratios shown. The pH of each, mixed with ten times its weight of distilled water, is given, in column 3 as calcined and in column 4, after milling for 15 minutes. The preferred material, precipitated chalk, is listed first.

TABLE 4

| Neutralizing agent used | Percent used | Distribution of fines (microns) | | pH as calcined | pH after milling |
|---|---|---|---|---|---|
| | | −25 | −15 | | |
| Precipitated chalk: | | | | | |
| 1 | 0.5 | 99 | 90 | 5.8 | 6.5 |
| 2 | 1.0 | | | 6.9 | 6.9 |
| 3 | 3.0 | | | 7.0 | 7.0 |
| No. 1 white: | | | | | |
| 4 | 0.5 | 62 | 31 | 5.6 | 6.3 |
| 5 | 1.0 | | | 6.6 | 6.6 |
| 6 | 3.0 | | | 7.0 | 7.0 |
| Purestone: | | | | | |
| 7 | 0.5 | 70 | 62 | 5.4 | 6.1 |
| 8 | 1.0 | | | 6.0 | 6.6 |
| 9 | 3.0 | | | 7.0 | 7.0 |
| Marble dust: | | | | | |
| 10 | 1.0 | 46 | 25 | 6.0 | 6.0 |
| 11 | 3.0 | | | 6.5 | 6.9 |
| Grind 98: | | | | | |
| 12 | 1.0 | 45 | 29 | 6.0 | 6.0 |
| 13 | 3.0 | | | 6.4 | 6.9 |

From these calculations, it is concluded that high-calcium limestones vary widely in their degree of reactivity, and that particle size plays an important part in their behavior. The fact that acceptable results could be secured with precipitated chalk, even at a value slightly lower than the amount theoretically needed to react with all of the acidic material present, is beleived to be due to the presence of the di-basic salt, $CaH(PO_4)$ which is only very slightly soluble and ionizes only to a very slight degree. Even though an amount less than needed to react with all of the acidic compounds present can produce a neutral stucco, it is not regarded as commercially feasible to use so little, for to do so leaves no latitude for variation in acid content from point to point in the same shipment.

Another observation is that, even with as little as 1% of No. 1 White and Purestone, which was about 90% of the amount theoretically required, it was still possible to obtain a final pH of 6.6, which is marginal, but usable. All of the No. 1 White had reacted in the calcining kettle, since tube milling did not increase pH. But some of the Purestone plainly had not reacted yet, for tube milling increased the pH from 6.0 to 6.6. Similarly, when only 1% of Marble dust was used, all of it reacted during calcination, and tube milling could not improve the pH of 6.0, whereas, when 3% was used, pH increased from 6.5 to 6.9 with milling. Similar observations apply to Grind 98.

The distribution of fines in the No. 1 White limestone was as follows: 99.2% smaller than 44 microns, 62% smaller than 25 microns, 47% smaller than 20 microns, 31% smaller than 15 microns, and 17% smaller than 10 microns.

The procedures outlined in discussion of the preferred process, using precipitated chalk, have been duplicated with the limestone known as No. 1 White, and with completely satisfactory results, in pilot plant operation. The amount used was 3%, in relation to a calculated acid content of 1.23% in the synthetic gypsum.

It has also been demonstrated, in laboratory tests, that when the distribution of fines is such that more than 65% will pass a 325-mesh screen, high-calcium limestone may be used, but the percentage has to be increased to such a point as to ensure that there will be enough of the material of micrometric dimensions (not over 44 microns) to react with the acidic impurities actively present. By increasing the proportion of slowly-reactive or relatively coarse limestone to 5%, it has been possible to attain a pH of 7.0 with all of the natural limestones thus far tested, at least after tube milling.

The fact that different limestones apparently react in different ways suggests the desirability, before initiating a commercial run of several days' duration, of conducting a laboratory test of the synthetic gypsum and of the specific limestone to be used, blending them into an intimate admixture, calcining the blended mixture, and determining the pH value. It is suggested that the quantity of calcium carbonate first tested be equal to twice the calculated acidity of the gypsum. If the pH of the calcined material, dispersed in ten times its weight of water, is above 6.0 the proportion is probably correct. Its sufficiency should be tested by tube milling. If the milled stucco is not at a pH of 6.5 or higher, the amount of carbonate to be added should be increased.

However, as previously noted, the calcium carbonate displaces, pro tanto, the cementitious content of the plaster, and therefore reduces its strength. For this reason, especially, it is recommended that the amount of calcium carbonate added should not exceed 5%, and should preferably be between 150% and 200% of the amount of the acidic impurities present.

Particle size evaluations have been performed, using a Coulter instrument, on several commercially available fine-ground natural limestones of high calcium content, and on precipitated chalk, with the results shown in Table 5, below.

TABLE 5—DISTRIBUTION OF FINES

| | Percent finer than— | | | | |
|---|---|---|---|---|---|
| | 44μ | 25μ | 20μ | 15μ | 10μ |
| Carbium [1] | 99.6 | 99 | 97.5 | 90 | 58 |
| No. 1 white | 99.2 | 62 | 47 | 31 | 17 |
| Purestone | 78.9 | 70 | 67.5 | 62 | 48 |
| Drikalite | 99.8 | 86 | 75 | 59 | 38 |
| No. 9 white | 96.4 | 47 | 35 | 24.5 | 14 |
| Marble dust | 92.6 | 46 | 35 | 25 | 15 |
| No. 5 white | 65.5 | 42 | 37.5 | 32 | 25.5 |
| 98 grind | 70.7 | 45 | 37.5 | 29 | 17 |
| OW 3815 | 88.8 | 46.5 | 36 | 25.5 | 15 |
| OW 3910 | 94.7 | 50.5 | 39 | 28 | 16 |

[1] Precipitated chalk.

This table suggests that in any specimen of fine-ground high-calcium limestone which contains more than 65% of particles smaller than 44 microns, there will be a large proportion smaller than 25 microns, and diminishing proportions of smaller sizes, but the particle sizes below 44 microns do not appear to bear a truly functional relationship to the effectiveness of the material. Thus, No. 1 White, as seen in Table 4, was one of the most effective materials, even though it contained a lower proportion of fines at every level below 44 microns than Purestone.

It has been indicated that the preferred method of using the carbonate is to incorporate it with the synthetic gypsum even before the initial drying occurs. This is desirable because the presence of the neutralizing agent tends to inhibit the corrosive effect on the equipment of any free acid present on the surface of the synthetic gypsum crystals. It is, of course, possible to dry the synthetic gypsum and, if desired, to subject it to a preliminary grinding operation, before adding the carbonate, but it is essential that the carbonate be intimately blended with the gypsum before calcination begins. It is also essential that the calcined material be milled after calcination, if a satisfactory plasterboard product is to be produced.

Although tube milling is the preferred method for attaining increased plasticity and stabilizing the pH value of the calcined stucco, comparable results can be achieved when using other equipment. However, if a Buhr mill or a hammer mill is used, it may be necessary to pass the stucco through it more than once in order to impart the desired degree of plasticity to the milled product.

The invention has been described with particular emphasis upon the preparation of plasterboard, because that is the area in which the most serious obstacles to the use of synthetic gypsum occur. It is, of course, apparent that a stucco which is usable in the production of plasterboard will be equally useful in forming any type of plaster. The milled stucco of this invention, inter alia, is outstandingly useful where a plaster coat is to be applied to a plasterboard base.

I claim:

1. In the process of producing plasterboard from synthetic gypsum containing as impurities mineral acid compounds of at least two of the group which consists of sulfur, phosphorus, and fluorine, the steps of intimately blending the impure synthetic gypsum with non-dolomitic calcium carbonate at least 65% of which is of an ultra fine particle size such as to pass a 325-mesh screen having openings of the order of 44 microns, the amount of calcium carbonate added being less than 5.0% of the dry weight of the synthetic gypsum and containing a sufficient proportion of such ultra fine particles to impart to the mixture after calcination at temperatures up to 350° F., a pH above 6.0; heating the pulverulent mixture so produced to calcining temperatures but not above about 374° F. until substantially all of the gypsum present has been converted to the hemihydrate form; grinding the calcined stucco so produced until at least 40% of it will pass a 325-mesh screen; mixing the finely-ground stucco with water until a good flowable consistency is attained; and spreading the resulting slurry between plasterboard cover papers, and producing a plasterboard therefrom.

2. The process of claim 1, wherein the calcium carbonate is precipitated chalk.

3. The process of claim 1, wherein the calcium carbonate powder contains precipitated chalk and non-dolomitic natural carbonate material predominently of a particle size not exceeding about 44 microns.

4. The process of claim 1, wherein the amount of calcium carbonate added is at least 150% of that theoretically required to react with the acidic compounds present.

5. A stucco formed from synthetic gypsum but substantially free of dolomitic limestone and of other constituents having latent reactivity and which is suitable for use in the production of plasterboard, said stucco consisting essentially of gypsum hemihydrate, but also containing the reaction products, formed by heating at calcination temperatures up to 374° F., of synthetic gypsum containing mineral acid compounds of at least two of the group which consists of sulfur, phosphorus and fluorine in intimate admixture with a quantity of nondolomitic calcium carbonate less than 5% of the weight of the synthetic gypsum, said carbonate being predominantly of a particle size smaller than 44 microns, said stucco also containing some unreacted calcium carbonate and manifesting a pH value of at least 6.0.

6. A stucco as defined in claim 5, in the form of a highly milled powder, at least 65% of which will pass a screen of 200 mesh and more than 40% of which will pass a screen of 325 mesh.

7. A stucco as defined in claim 6, which, when mixed with about 50% of its weight of water, will yield a mortar-like paste having a plasticity of at least 3 strokes when subjected to the blotter test herein defined.

8. A product comprising a stucco as defined in claim 14 after having been ground to such a degree of fineness that upon being mixed to a mortar consistency with water, it will form a paste which will manifest a plasticity of from 3 to 30 strokes when subjected to the blotter test herein defined.

9. A plasterboard comprising a rigid sheet of hard plaster between paper cover sheets uniformly and durably bonded together over their entire flat surfaces, said plaster being formed from the ground stucco defined in claim 8.

10. In the process of producing plasterboard from synthetic gypsum containing as impurities mineral acid compounds of at least two of the group which consists of sulfur, phosphorus, and fluorine, the steps of intimately blending the impure synthetic gypsum with nondolomitic calcium carbonate at least 65% of which is of an ultra-fine particle size such as to pass a 325-mesh screen having openings of the order of 44 microns, the amount of calcium carbonate added being less than 5.0% of the dry weight of the synthetic gypsum and containing a sufficient proportion of such ultrafine particles to impart to the mixture after calcination at temperatures up to 350° F., a pH above 6.0; heating the pulverulent mixture so produced at calcining temperatures but not above about 374° F. until substantially all of the gypsum present has been converted to the hemihydrate form; grinding the calcined stucco so produced to a degree of fineness such as to permit the formation, upon the addition of water, of a mortar having a plasticity value of at least 3, thereafter admixing the ground stucco with the amount of water needed to produce a flowable slurry, spreading the slurry upon a paper web, applying a covering paper web, and heat drying the resultant product to form plasterboard.

11. In a process as defined in claim 10, the step of interposing a time delay for rehydration of the slurry after application of the paper web and prior to heat drying the product.

12. A process for preparing synthetic gypsum for use in plasterboard, comprising intimately blending synthetic gypsum containing a minor percentage of acidic material with precipitated chalk in an amount in excess of that required to neutralize the calculated acidity present but not in excess of about 3 times that needed to neutralize the calculated acidity, calcining the blend until the bulk of the gypsum has been reduced to the hemihydrate state, and thereafter grinding the calcined material until a paste thereof manifests a plasticity of from 3 to 20, when measured by the Carson blotter test.

References Cited

UNITED STATES PATENTS

| | | | |
|---|---|---|---|
| 1,900,381 | 3/1933 | Hansen | 106—110 |
| 2,606,127 | 8/1952 | Weber | 106—109 |
| 2,655,430 | 10/1953 | Schiermeier | 23—122 |
| 2,937,926 | 5/1960 | Hanusch | 106—109 |
| 3,047,447 | 7/1962 | Stasse | 106—109 |

FOREIGN PATENTS 514,942  11/1939  Great Britain.

TOBIAS E. LEVOW, *Primary Examiner.*

SAMUEL E. MOTT, *Assistant Examiner.*

U.S. Cl. X.R.

23—122; 106—109, 110; 156—39

UNITED STATES PATENT OFFICE
CERTIFICATE OF CORRECTION

Patent No. 3,445,323                      May 20, 1969

Adolph Schnabel

It is certified that error appears in the above identified patent and that said Letters Patent are hereby corrected as shown below:

Column 1, line 57, "film" should read -- firm --. Column 3, line 24, "sulfatfe" should read -- sulfate --. Column 9, line 10, "Example I" should read -- Example II --. Column 10, line 42, "(51.1"" should read -- (51.1) --. Column 11, line 67, "exaluated" should read -- evaluated --. Column 14, line 53, "14" should read -- 5 --.

Signed and sealed this 6th day of January 1970.

(SEAL)
Attest:

Edward M. Fletcher, Jr.                  WILLIAM E. SCHUYLER, JR.
Attesting Officer                          Commissioner of Patents